WILLIAM C. PERCY.
Improvement in Cultivators.

No. 127,508. Patented June 4, 1872.

Witnesses:
John Becker.
Francis McArd

Inventor:
W. C. Percy
Per
Attorneys.

UNITED STATES PATENT OFFICE.

WILLIAM C. PERCY, OF BAYOU SARA, LOUISIANA.

IMPROVEMENT IN CULTIVATORS.

Specification forming part of Letters Patent No. 127,508, dated June 4, 1872.

*To all whom it may concern:*

Be it known that I, WILLIAM C. PERCY, of Bayou Sara, in the parish of West Feliciana and State of Louisiana, have invented a new and useful Improvement in Cultivators; and I do hereby declare that the following is a full, clear, and exact description thereof, which will enable others skilled in the art to make and use the same, reference being had to the accompanying drawing forming part of this specification.

Figure 1:
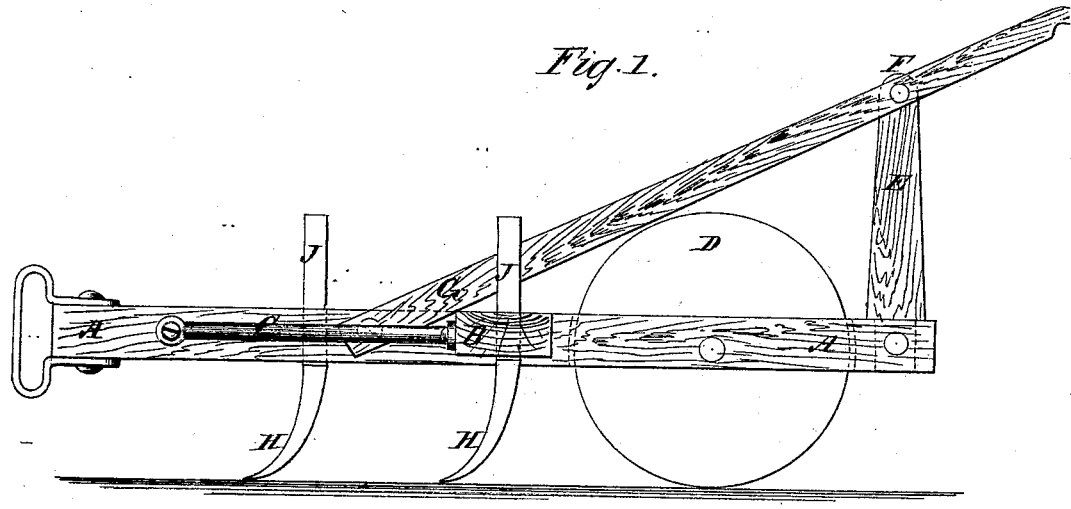
Figure 2:
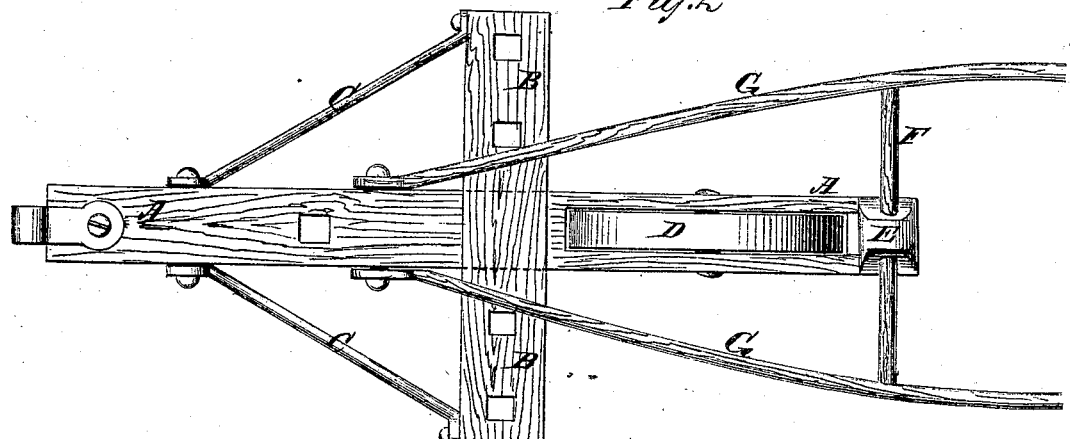
Figure 3:
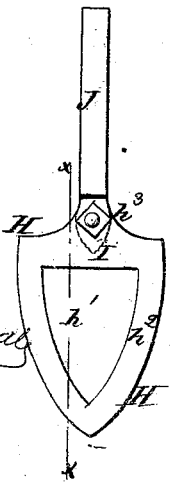
Figure 4:
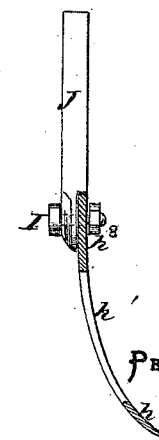

Figure 1 is a side view of a cultivator-frame provided with the improved shovel. Fig. 2 is a top view of the same. Fig. 3 is a detail front view of the shovel. Fig. 4 is a detail longitudinal section of the same taken through the line $x\ x$, Fig. 3.

My invention has for its object to furnish an improved cultivator for cultivating cotton and corn, especially when it is desired to simply loosen and pulverize the soil and destroy the weeds without turning a furrow.

A represents the beam; B, the cross-bar, provided with braces C; G, the handles; E F, the support for the same; and D, the supporting-roller of a cultivator-frame, to which I attach my improved shovel. H is the plow, which is made pointed, and is curved forward, as shown in Figs. 1 and 4, said curve being, for an ordinary-sized plow, about the arc of a circle ten inches in diameter. The middle part of the plow H is cut away, as shown in Figs. 3 and 4, forming a hole or opening, $h^1$, of about the same shape as the body of the said plow H, the plow thus consisting of a rim or frame, $h^2$. The curvature of the plow H and the opening $h^1$ cause the plow to pass easily through the ground, destroying the weeds, stirring up and loosening the soil, which passes back through the opening $h^1$ and around the rim $h^2$, thus turning no furrow, and leaving the soil loose and level. Upon the top or upper part of the plow is formed a projection, $h^3$, through which is formed a hole to receive the bolt I, by which the plow is secured in its seat upon the lower end of the standard J.

The standard J I prefer to make square, as shown in Figs. 1, 3, and 4, so that it can be attached to a cultivator-frame by simply forming a square hole and wedging, keying, or otherwise securing the said standard in said holes.

I prefer to use three of the plows, H I J—one attached to the forward part of the longitudinal beam A and two attached to the end parts of the cross-beam B—several holes being formed in the end parts of the said cross-beam B to receive the standards of the plows, so that the side plows may be moved in or out, as may be desired.

Having thus described my invention, I claim as new, and desire to secure by Letters Patent—

The tapering plow H, curved upon the arc of a circle, and having an opening formed in its middle part, leaving the plow simply a rim or frame, substantially as herein shown and described, and for the purpose set forth.

WM. C. PERCY.

Witnesses:
    CLARENCE DOHERTY,
    C. E. BARROW.